United States Patent [19]
Kaye

[11] 4,429,400
[45] Jan. 31, 1984

[54] LASERS

[75] Inventor: Alan S. Kaye, Wantage, England

[73] Assignee: United Kingdom Atomic Energy Authority, London, England

[21] Appl. No.: 312,133

[22] Filed: Oct. 16, 1981

[30] Foreign Application Priority Data

Nov. 12, 1980 [GB] United Kingdom ............... 8036332

[51] Int. Cl.³ .............................................. H01S 3/08
[52] U.S. Cl. ..................................... 372/95; 372/103; 372/108; 372/98
[58] Field of Search ................... 372/95, 93, 92, 107, 372/108, 98, 99, 101, 103

[56] References Cited

U.S. PATENT DOCUMENTS 3,909,744 9/1975 Wisner et al. ...................... 372/95
3,937,079 2/1976 Chodzko ............................ 372/95
4,079,340 3/1978 Weiner et al. ..................... 372/95
4,126,381 11/1978 Chodzko et al. .................. 372/95

OTHER PUBLICATIONS

"Annular Converging Wave Resonator: New Insights", Paxton et al., *Optics Letters*, vol. 1, No. 5, Nov. 1977.

*Primary Examiner*—William L. Sikes
*Assistant Examiner*—Léon Scott, Jr.
*Attorney, Agent, or Firm*—William R. Hinds

[57] ABSTRACT

A laser having an unstable optical cavity including an output mirror having an off-axis hole therein through which laser radiation can pass to maintain lasing action in an active medium situated in the laser optical cavity, wherein the output mirror is so shaped and positioned as to present an elliptical profile to laser radiation incident upon it, the major axis of the ellipse extending in the direction of offset of the hole in the output mirror.

9 Claims, 5 Drawing Figures

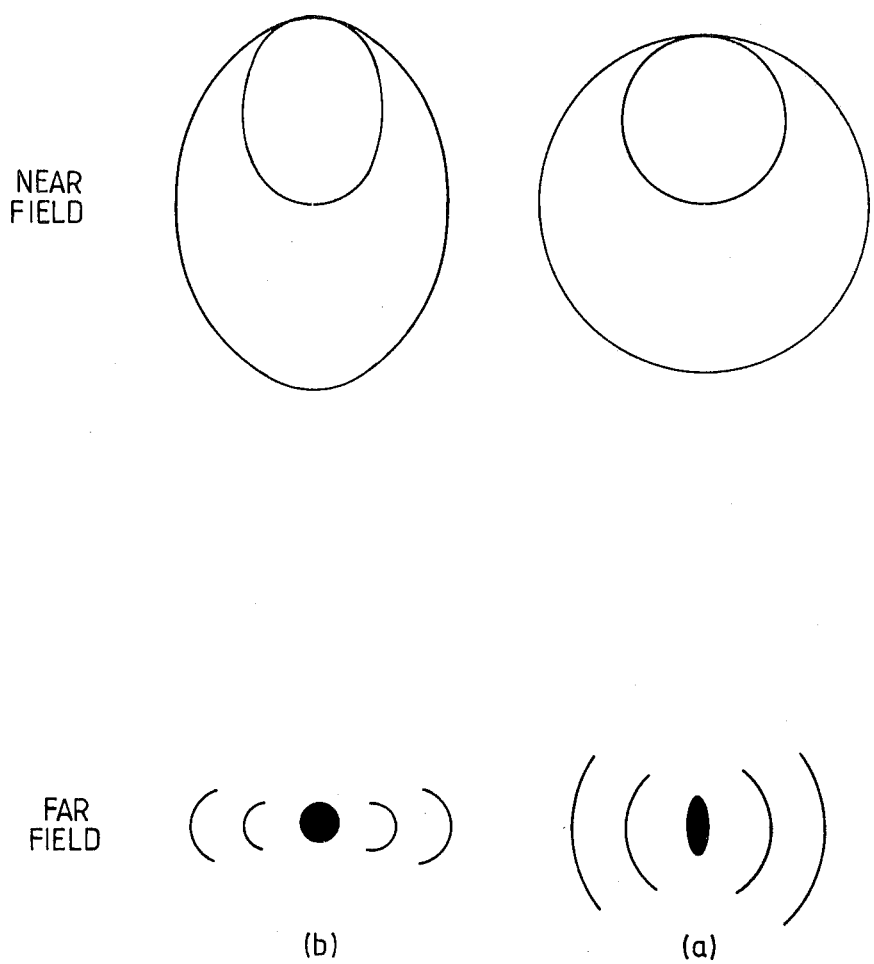
Fig. 5 Elliptical transformation of off-axis annular beam

LASERS

The present invention relates to lasers having unstable optical cavities.

A common form of on-axis unstable laser optical cavity has a concave mirror facing a convex mirror and an output plane mirror situated between them at an angle so that light impinging on it is reflected out of the optical cavity. The output mirror has an axial hole which enables a proportion of the light to pass through the mirror so as to maintain lasing action in a lasing medium which is situated in the optical cavity. Such a laser optical cavity has the advantage that there may be produced an output beam which has a degree of collimation which is very close to that predicted by diffraction theory. The disadvantage of such a form of laser optical cavity is that the output beam has an annular profile. The ratio of the outside and inside diameters of the mirror is referred to as the magnification, M, of the laser optical cavity. As the value of M is decreased so the far-field diffraction pattern of the output beam, which consists of a central spike surrounded by a series of rings, is degraded by the transfer of power from the central spike into the surrounding rings. This situated can be improved by moving the hole in the output mirror into a position away from the optical axis of the laser optical cavity. However, another disadvantage is then introduced in that the diffraction pattern, and in particular the central spike, is no longer circular in form.

According to the present invention there is provided a laser having an unstable optical cavity including an output mirror having an off-axis hole therein through which laser radiation can pass to maintain lasing action in an active medium situated in the laser optical cavity, wherein the output mirror is so shaped and positioned as to present an elliptical profile to laser radiation incident upon it, the major axis of the ellipse extending in the direction of offset of the hole in the output mirror.

For a fully offset hole the optimum ellipticity of the output mirror is in the region of 1.35.

The invention will now be described by way of example, with reference to the accompanying drawings, in which:

FIG. 5 shows near and far field beam patterns for the output mirror configurations of FIGS. 3 and 4.

Figure 1:
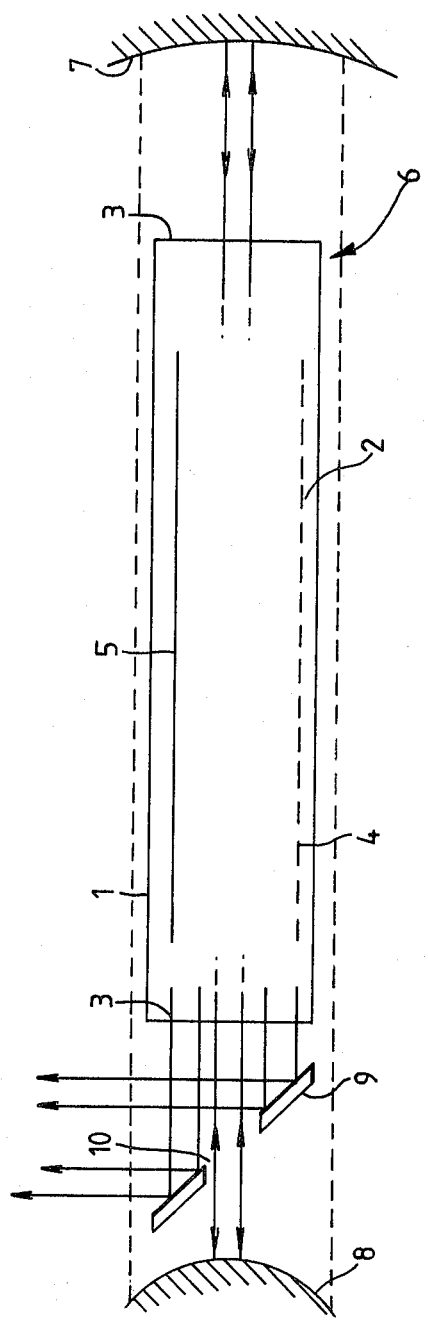
FIG. 1 is a diagrammatic representation of a laser using a conventional unstable optical cavity.
Figure 2:
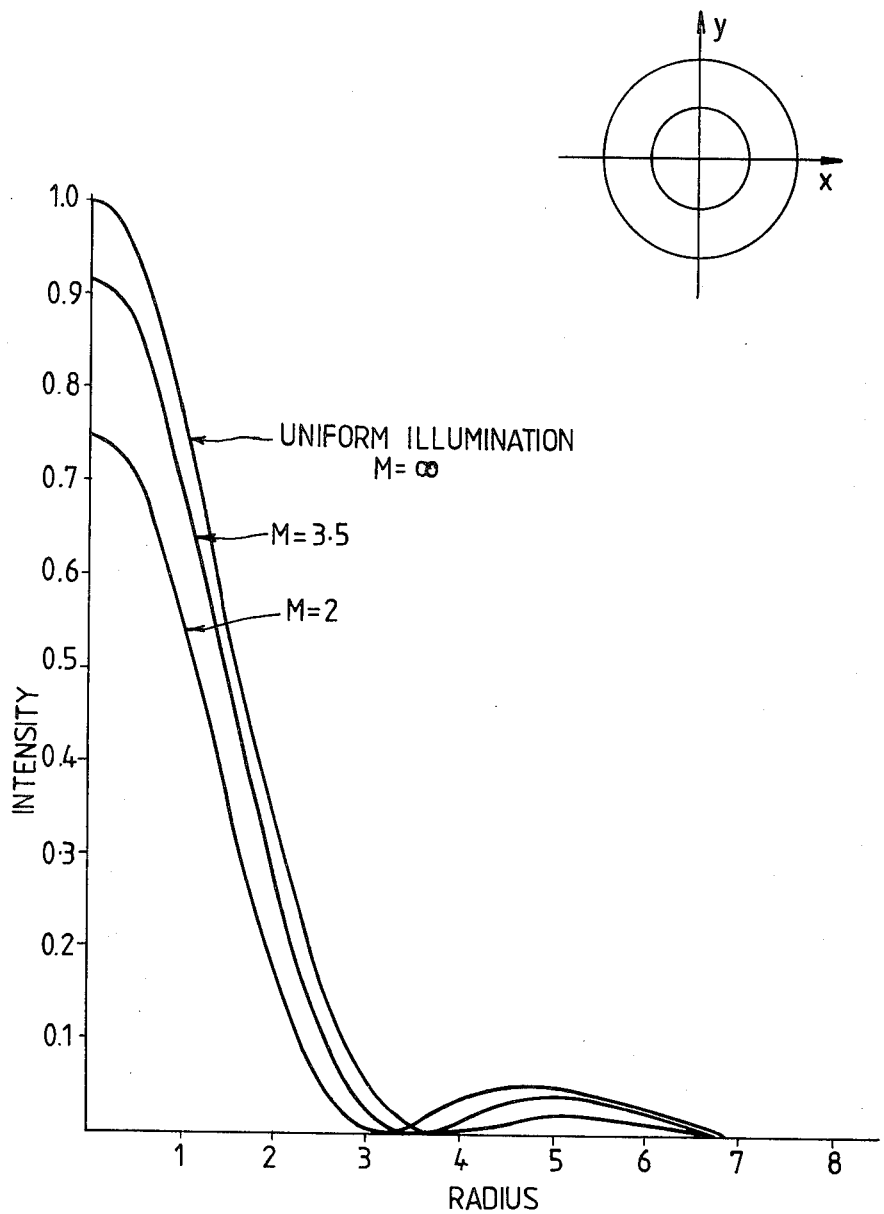
FIG. 2 shows the ideal power distribution in the far field diffraction pattern of such a laser optical cavity for differing values of cavity magnification, together with a representation of the profile of the output mirror used in such a cavity.

Referring to FIGS. 1 and 2, a transversely excited gas laser with a conventional on-axis unstable optical cavity consists of a container 1 for an active gaseous medium 2. The container 1 has transparent end walls 3 and contains an anode electrode 4 and a cathode electrode 5 by means of which the active medium 2 can be excited to a lasing condition. The container 2 is situated in an optical cavity 6 formed by a concave mirror 7 and a convex mirror 8. An output plane mirror 9 is also situated within the optical cavity 6 and is positioned so as to reflect laser radiation out of the laser optical cavity 6.

The output mirror 9 has a central hole 10 which enables a proportion of the laser radiation to pass through it so that lasing action can be initiated and maintained in the lasing medium 2. The shape and position of the output mirror 9 is such that it presents a circular annular profile to laser radiation travelling between the mirrors 7 and 8, as shown in FIG. 2.

FIG. 2 shows the far-field diffraction pattern for three values of the magnification M of the laser optical cavity 2. The value for $M = \infty$, that is there is no central hole 10 in the output mirror 9, gives the theoretical ideal distribution of energy between the central spike and the first bright ring of the diffraction pattern. There are other rings, but they are much weaker than the first ring and so are ignored. It can be seen that as M is decreased, so more power is transferred from the central spike to the first bright ring of the diffraction pattern. Unfortunately, a value of M in the region of 2 typically is required for effective lasing action to build up.

Figure 3:
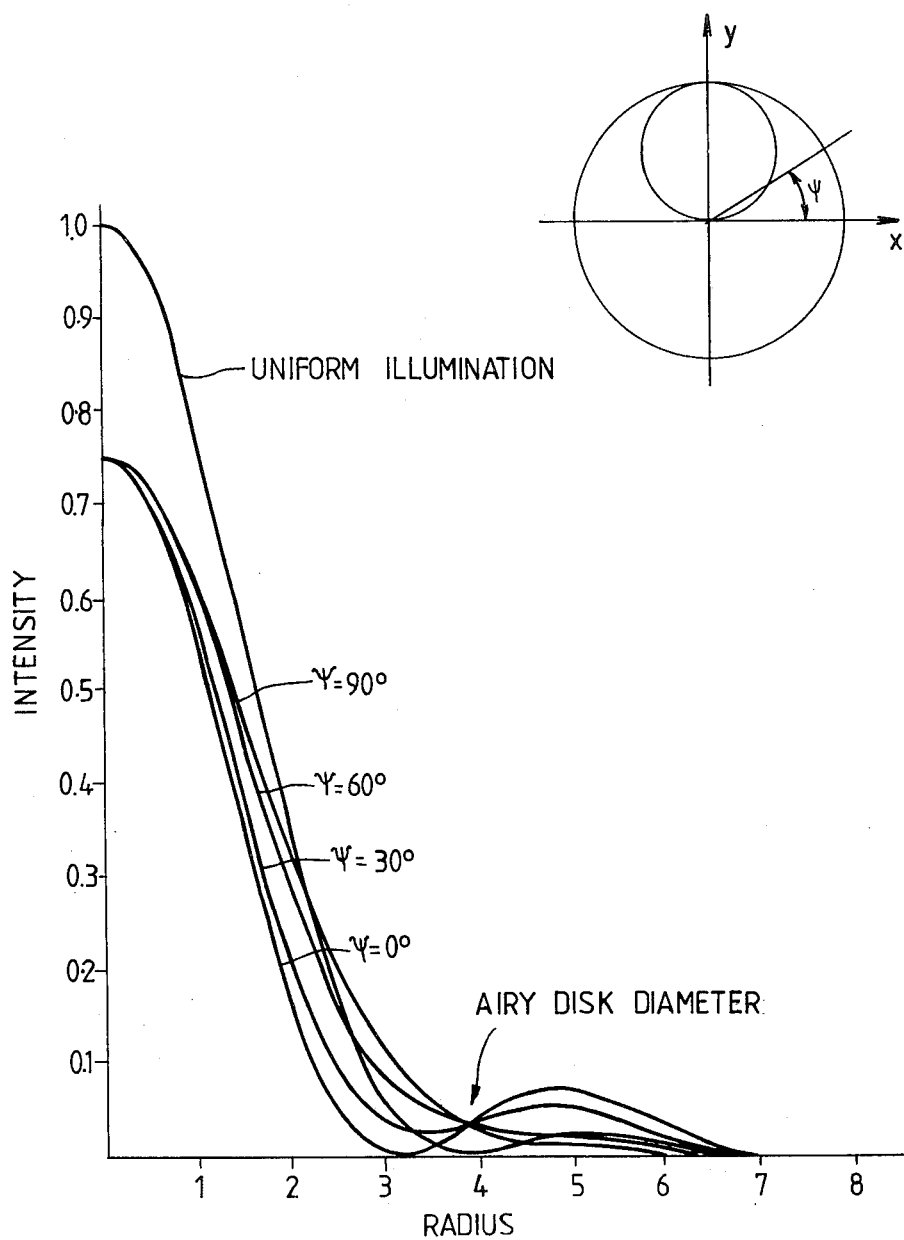
FIG. 3 shows corresponding curves and mirror profile for an existing off-axis output mirror configuration.

FIG. 3 shows the situation for a value of $M = 2$ as the angular separation of the centre of the hole 10 from the geometrical axis of the output mirror 9 is increased. It can be seen that although the maximum brightness of the central spike of the diffraction pattern is not changed from that of FIG. 2, the power contained within the Airy disc is increased.

Figure 4:
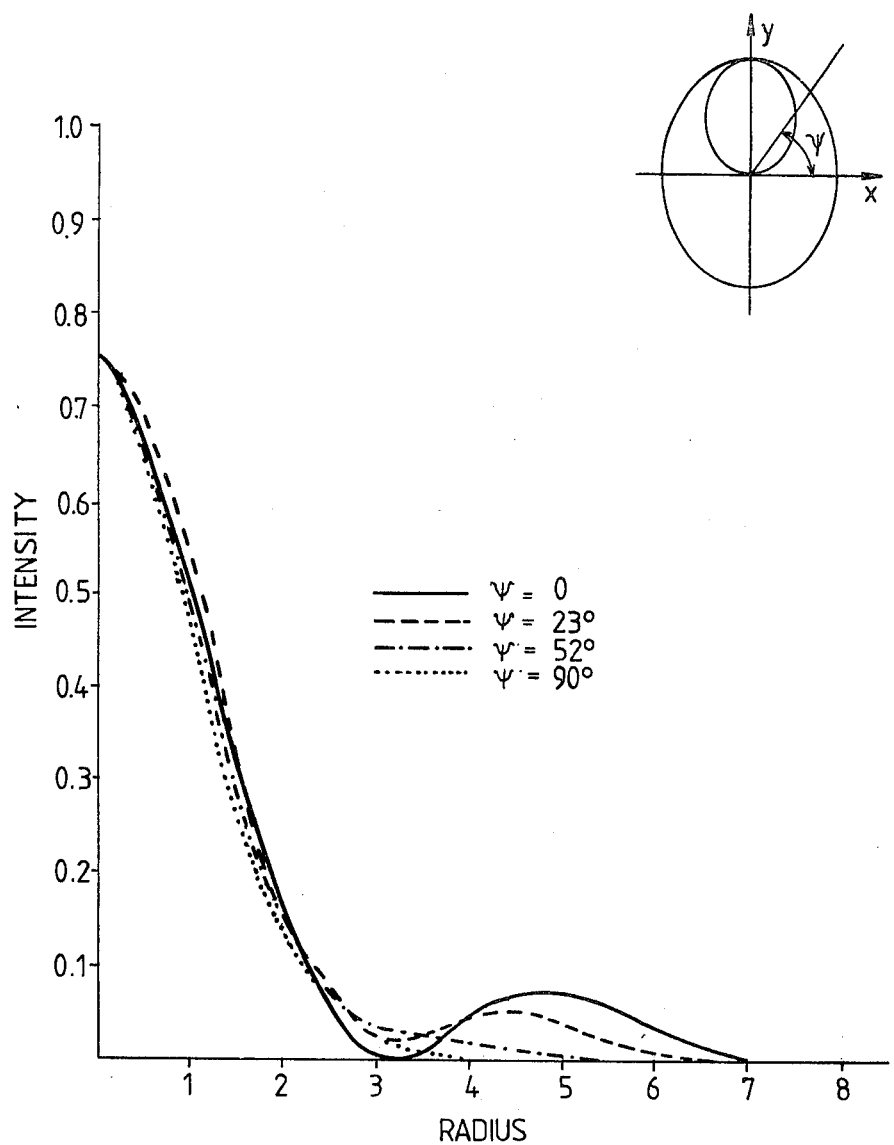
FIG. 4 shows corresponding curves and mirror profile for an embodiment of the present invention.

FIG. 4, shows corresponding curves and mirror profile for an output mirror 9 which embodies the present invention.

Again, the curves are drawn for a value of $M = 2$. The improved mirror 9 has an elliptical aperture, as does the off-axis hole 10, with the major axis of the mirror 9 and the hole 10 in alignment. As can be seen from FIG. 4, the effect of introducing an ellipticity $\epsilon < 1$ in the direction of offset of the hole 10 is to compress the far field diffraction pattern by a factor $1/\epsilon$ in the plane of elongation of the mirror 9. Thus the central spike of the far field diffraction pattern can be restored to an axially symmetrical shape, although the outer rings are distorted. However, due to their weakness, this is less important.

The value of $\epsilon$ required to do this is a function of M; for a value of $M = 2$ it can be shown that the optimum value of $\epsilon$ is 1.35.

The use of an elliptical aperture output mirror has an additional advantage where the lasing action takes place in a region which is elongated in one direction. For example, in transverse flow high power gas lasers the lasing region is elongated in the direction of flow of the lasing medium. If the gain of the lasing medium is uniform, an optical cavity with an ellipticity $\epsilon$ will increase the mode volume and the extracted power by a factor $\epsilon$. The peak intensity on the axis of the laser beam is increased by a factor $\epsilon^2$. The power enclosed in the Airy disk will be increased by the offset of the elliptical aperture (by a factor dependent on M), by the increased total power extracted, and by the distortion of the central spike introduced by the elliptical aperture.

For a value of $M = 2$ and the optimum value of $\epsilon(1.35)$ the enclosed power is about doubled.

FIGS. 5(a) and (b) shows respectively the near and far-field intensity distribution of the circular off-axis aperture mirror and the elliptical off-axis aperture mirror, respectively. It can be seen that the circular off-axis aperture mirror produces a far-field diffraction pattern in which the central spike is distorted into an elliptical shape whereas the elliptical aperture mirror restores the circular symmetry to the central spike of the far-field diffraction pattern.

I claim:

1. Laser apparatus comprising means forming a laser, said laser having an unstable optical cavity including an output mirror having an off-axis hole therein through which laser radiation can pass to maintain lasing action in an active medium situated in the laser optical cavity, wherein the output mirror is so shaped and positioned as to present an elliptical profile to laser radiation incident upon it, the major axis of the ellipse extending in the direction of offset of the hole in the output mirror.

2. A laser as claimed in claim 1 comprising a transverse flow gas laser including a lasing region having a rectangular cross-section with its major axis aligned with the direction of flow of the gaseous lasing medium, wherein the major diameter of the profile of the output mirror is aligned with the major axis of the lasing region.

3. A laser according to claim 1 or claim 2, wherein said off-axis hole is so shaped as to present an elliptical profile to laser radiation incident upon it, and the ratio of the major diameters of the output mirror and said hole is substantially equal to two and the ellipticity of the profile of the output mirror and said hole is substantially 1.35.

4. Laser apparatus comprising means forming a laser, said laser comprising a lasing region situated within an unstable optical cavity formed by a concave mirror facing a convex mirror, the centers of curvature of the mirrors defining an optical axis of the unstable optical cavity, means for exciting lasing action in a lasing medium contained in the lasing region within the optical cavity, and an output mirror for extracting laser radiation from the optical cavity, wherein the output mirror has a hole therein situated off-set from the optical axis of the optical cavity, the mirror being so shaped as to present an elliptical profile to laser radiation incident upon it, the major axis of the ellipse extending in the direction of off-set of the hole in the output mirror from the optical axis of the cavity.

5. A laser according to claim 4 wherein the said hole in the output mirror also is so shaped as to present an elliptical profile to laser radiation incident upon it, the major axes of the two ellipses being coincident.

6. A laser according to claim 5 wherein the ratio of the major diameters of the output mirror and the said hole is substantially equal to 2, and the ellipticity of the profile of the output mirror and the said hole is substantially equal to 1.35.

7. A laser according to claim 4 or claim 5 wherein the lasing region forms part of a duct through which a lasing medium can be caused to flow in a direction which is orthoganal to the optical axis of the optical cavity and the major diameter of the elliptical profile of the output mirror is aligned with the direction of flow of the lasing medium.

8. A laser according to claim 7 wherein the ratio of the major diameters of the output mirror and the said hole is substantially equal to 2, and the ellipticity of the profile of the output mirror and the said hole is substantially equal to 1.35.

9. A laser according to claim 8 wherein the lasing medium is gaseous.

* * * * *